(12) United States Patent
Awata

(10) Patent No.: US 8,701,209 B2
(45) Date of Patent: Apr. 15, 2014

(54) MEASUREMENT DATA MANAGEMENT AND AUTHENTICATION METHOD AND MEASUREMENT DATA MANAGEMENT AND AUTHENTICATION SYSTEM

(75) Inventor: Takao Awata, Kobe (JP)

(73) Assignee: Kei Communication Technology Inc., Kobe-shi (JP)

( * ) Notice: Subject to any disclaimer, the term of this patent is extended or adjusted under 35 U.S.C. 154(b) by 0 days.

(21) Appl. No.: 13/636,453

(22) PCT Filed: Mar. 14, 2011

(86) PCT No.: PCT/JP2011/055917
§ 371 (c)(1),
(2), (4) Date: Sep. 21, 2012

(87) PCT Pub. No.: WO2011/118432
PCT Pub. Date: Sep. 29, 2011

(65) Prior Publication Data
US 2013/0014287 A1    Jan. 10, 2013

(30) Foreign Application Priority Data

Mar. 25, 2010 (JP) ................................. 2010-069500

(51) Int. Cl.
*G06F 17/30* (2006.01)
(52) U.S. Cl.
USPC .................................. 726/30; 726/26; 726/27
(58) Field of Classification Search
USPC ............................................. 726/30, 26, 27
See application file for complete search history.

(56) References Cited

U.S. PATENT DOCUMENTS 6,895,507 B1 *  5/2005  Teppler ........................... 726/19

(Continued)

FOREIGN PATENT DOCUMENTS

EP     1361695 A2    11/2003
JP    2002-015235     1/2002

(Continued)

OTHER PUBLICATIONS

English-language abstract of Japanese Patent No. 2002-015235, Japan Patent Office, Jan. 18, 2002.

(Continued)

*Primary Examiner* — Harunur Rashid
(74) *Attorney, Agent, or Firm* — DASCENZO Intellectual Property Law, P.C.

(57) ABSTRACT

Remote meter reading terminal devices 2 generate electronic signature data based on meter reading information that includes a measured value acquired by electricity meters 3, measurement date and time, and an electricity meter ID, and transmit the generated electronic signature data and the meter reading information to a meter reading data management server 1. When the verification of the electronic signature data received from the remote meter reading terminal devices 2 has succeeded, the meter reading data management server 1 generates a hash value of the meter reading information and transmits the generated hash value to a TSA server 4. The meter reading data management server 1 also acquires a time stamp generated by the TSA server 4 and stores therein meter reading data that includes the time stamp, the meter reading information, the electronic signature data and the hash value.

14 Claims, 7 Drawing Sheets

(56) References Cited

U.S. PATENT DOCUMENTS

| | | | |
|---|---|---|---|
| 2002/0056042 A1* | 5/2002 | van der Kaay et al. | 713/178 |
| 2003/0212828 A1* | 11/2003 | Miyazaki et al. | 709/248 |
| 2006/0120345 A1* | 6/2006 | Sung et al. | 370/351 |
| 2006/0206433 A1 | 9/2006 | Scoggins | |
| 2007/0118754 A1* | 5/2007 | Togashi et al. | 713/178 |
| 2010/0241848 A1* | 9/2010 | Smith et al. | 713/153 |
| 2011/0004764 A1* | 1/2011 | Stuber | 713/176 |
| 2011/0010547 A1* | 1/2011 | Noda | 713/168 |

FOREIGN PATENT DOCUMENTS

| | | |
|---|---|---|
| JP | 2002-149060 | 5/2002 |
| JP | 2003-323357 | 11/2003 |
| JP | 2007-109209 | 4/2007 |
| JP | 2007-215103 | 8/2007 |
| JP | 2007-215104 | 8/2007 |
| JP | 2007-249559 | 9/2007 |
| JP | 2007-306352 | 11/2007 |
| JP | 2008-090544 | 4/2008 |
| WO | WO 01/63927 | 8/2001 |

OTHER PUBLICATIONS

English-language abstract of Japanese Patent No. 2002-149060, Japan Patent Office, May 22, 2002.

English-language abstract of Japanese Patent No. 2003-323357, European Patent Office, Nov. 14, 2003.

English-language abstract of Japanese Patent No. 2007-109209, Japan Patent Office, Apr. 26, 2007.

English-language abstract of Japanese Patent No. 2007-215103, Japan Patent Office, Aug. 23, 2007.

English-language abstract of Japanese Patent No. 2007-215104, European Patent Office, Aug. 23, 2007.

English-language abstract of Japanese Patent No. 2007-249559, European Patent Office, Sep. 27, 2007.

English-language abstract of Japanese Patent No. 2007-306352, European Patent Office, Nov. 22, 2007.

English-language abstract of Japanese Patent No. 2008-090544, Japan Patent Office, Apr. 17, 2008.

Schneier B., "Intermediate Protocols, Timestamping Services," Applied Cryptography, Protocols, Algorithms, and Source Code in C, John Wiley & Sons, Inc., New York, pp. 75-78, Jan. 1, 1996.

* cited by examiner

MEASUREMENT DATA MANAGEMENT AND AUTHENTICATION METHOD AND MEASUREMENT DATA MANAGEMENT AND AUTHENTICATION SYSTEM

TECHNICAL FIELD

The present invention relates to a measurement data management method for managing measurement data associated with measured values of an electricity meter, a gas meter and the like, and to a measurement data management system for implementing the measurement data management method.

BACKGROUND ART

In recent years, advancement in communication network technology has led to a suggestion of a computer system in which various meters installed at remote places, such as electricity meters and gas meters, exchange various types of data with a center device via communication networks, and the center device can thus centrally manage measurement data associated with measured values acquired by the meters.

For example, Patent Document 1 discloses a remote management system that includes a plurality of terminal devices divided into a plurality of groups and a center device. In this remote management system, a specific terminal device in each group collects meter reading data of other terminal devices belonging to the same group and transmits the collected meter reading data to the center device all at once. This remote management system can alleviate the load on the center device compared to the case where each terminal device individually transmits meter reading data to the center device, thus allowing for efficient collection of meter reading data.

CITATION LIST

Patent Document

Patent Document 1: JP 2008-90544A

SUMMARY OF INVENTION

Problem to be Solved by the Invention

In the case of remote management using communication networks, there is a risk that someone may tamper with data during communication. It is therefore necessary to provide a mechanism for detecting the occurrence of such data tampering. When using the Internet, which has a high risk of tampering, a demand for such a mechanism is considered to be even higher.

However, the above remote management system cannot guarantee the validity of the collected data because it does not have means for detecting the occurrence of data tampering during communication between the center device and the terminal devices or during communication among the terminal devices.

The present invention has been made in view of the above issues. A main object of the present invention is to provide a measurement data management method that can solve the above problem using time data, and a measurement data management system for implementing the measurement data management method.

Means for Solving Problem

In order to solve the above problem, a measurement data management method according to one aspect of the present invention manages measurement data using a terminal device, a measurement data management device, an authentication device, and a time authentication authority. The measurement data includes a measured value acquired through measurement processing executed by a meter. The terminal device is connected to the meter. The measurement data management device is communicably connected to the terminal device and manages the measurement data. The authentication device authenticates the measurement data managed by the measurement data management device. The time authentication authority authenticates time. The terminal device executes: an electronic signature step of generating electronic signature data based on measurement information including the measured value acquired through the measurement processing executed by the meter, measurement date and time when the measurement processing is executed, and an identifier for identifying the meter; and a transmission step of transmitting the electronic signature data generated in the electronic signature step and the measurement information to the measurement data management device. The measurement data management device executes: an electronic signature data verification step of verifying the electronic signature data received from the terminal device; a hash value generation step of, when the verification of the electronic signature data has succeeded in the electronic signature data verification step, generating a hash value of the measurement information received from the terminal device; a hash value transmission step of transmitting the hash value generated in the hash value generation step to the time authentication authority; a time stamp acquisition step of acquiring, from the time authentication authority, a time stamp token including a time stamp generated by the time authentication authority based on the hash value and the hash value; and a measurement data storage step of storing measurement data including the measurement information, the electronic signature data, and the time stamp token acquired in the time stamp acquisition step. The authentication device executes: a measurement data acquisition step of acquiring the measurement data from the measurement data management device; and a time stamp verification request step of transmitting the time stamp token included in the measurement data acquired in the measurement data acquisition step to the time authentication authority so as to request the time authentication authority to verify the time stamp included in the time stamp token. The time authentication authority executes: a time stamp token storage step of storing the time stamp token that has been generated based on the hash value acquired as a result of the hash value transmission step; a time stamp verification step of verifying the time stamp included in the time stamp token that has been acquired from the authentication device as a result of the time stamp verification request step based on the hash value included in the time stamp token stored in the time stamp token storage step; and a verification result transmission step of transmitting a result of the verification of the time stamp verification step to the authentication device.

In the measurement data management method according to the above aspect, the measurement data management device may further execute a measurement data transmission step of transmitting the measurement data stored in the measurement data storage step to an external device, and the time stamp included in the measurement data may be verified by the external device that has received the measurement data from the measurement data management device and the time authentication authority.

Furthermore, in the electronic signature step according to the above aspect, the terminal device may acquire the measurement date and time from an external NTP server.

In the measurement data management method according to the above aspect, the terminal device may further execute a determination step of acquiring the measured value from the meter multiple times and determining whether or not the multiple measured values thus acquired match, and may execute the electronic signature step when it has been determined that the multiple measured values match in the determination step.

A measurement data management system according to one aspect of the present invention includes a terminal device, a measurement data management device, an authentication device, and a time authentication authority. The terminal device is connected to a meter. The measurement data management device is communicably connected to the terminal device and manages measurement data that includes a measured value acquired through measurement processing executed by the meter. The authentication device authenticates the measurement data managed by the measurement data management device. The time authentication authority authenticates time. The terminal device includes: an electronic signature means for generating electronic signature data based on measurement information including the measured value acquired through the measurement processing executed by the meter, measurement date and time when the measurement processing is executed, and an identifier for identifying the meter; and a transmission means for transmitting the electronic signature data generated by the electronic signature means and the measurement information to the measurement data management device. The measurement data management device includes: an electronic signature data verification means for verifying the electronic signature data received from the terminal device; a hash value generation means for, when the electronic signature data verification means has succeeded in the verification of the electronic signature data, generating a hash value of the measurement information received from the terminal device; a hash value transmission means for transmitting the hash value generated by the hash value generation means to the time authentication authority; a time stamp acquisition means for acquiring, from the time authentication authority, a time stamp token including a time stamp generated by the time authentication authority based on the hash value and the hash value; and a measurement data storage means for storing measurement data including the measurement information, the electronic signature data, and the time stamp token acquired by the time stamp acquisition means. The authentication device includes: a measurement data acquisition means for acquiring the measurement data from the measurement data management device; and a time stamp verification request means for transmitting the time stamp token included in the measurement data acquired by the measurement data acquisition means to the time authentication authority so as to request the time authentication authority to verify the time stamp included in the time stamp token. The time authentication authority includes: a time stamp token storage means for storing the time stamp token that has been generated based on the hash value acquired from the measurement data management device; a time stamp verification means for verifying the time stamp included in the time stamp token that has been acquired from the authentication device based on the hash value included in the time stamp token stored by the time stamp token storage means; and a verification result transmission means for transmitting a result of the verification by the time stamp verification means to the authentication device.

In the measurement data management system according to the above aspect, the measurement data management device may further include a measurement data transmission means for transmitting the measurement data stored by the measurement data storage means to an external device that verifies the time stamp included in the measurement data together with the time authentication authority.

In the measurement data management system according to the above aspect, the electronic signature means may be configured to acquire the measurement date and time from an external NTP server.

In the measurement data management system according to the above aspect, the terminal device may further include a determination means for acquiring the measured value from the meter multiple times and determining whether or not the multiple measured values thus acquired match, and the electronic signature means may be configured to generate the electronic signature data when the determination means has determined that the multiple measured values match.

Effect of the Invention

The measurement data management method and the measurement data management system according to the present invention can check whether or not the measurement data has been tampered with in the course of communication among devices.

DESCRIPTION OF EMBODIMENTS

The following describes a preferred embodiment of the present invention with reference to the drawings. It should be noted that the following embodiment presents examples of a method and a device for embodying the technical ideas of the present invention, and does not limit the technical ideas of the present invention. Various modifications may be made to the technical ideas of the present invention within a technical scope described in the claims.

The present invention can be implemented using data acquired by meters that measure various types of measurement targets, such as electricity meters and gas meters. Specifically, the present embodiment discusses an example in which data acquired by electricity meters is used.

[Configuration of Measurement Data Management System]

Figure 1:
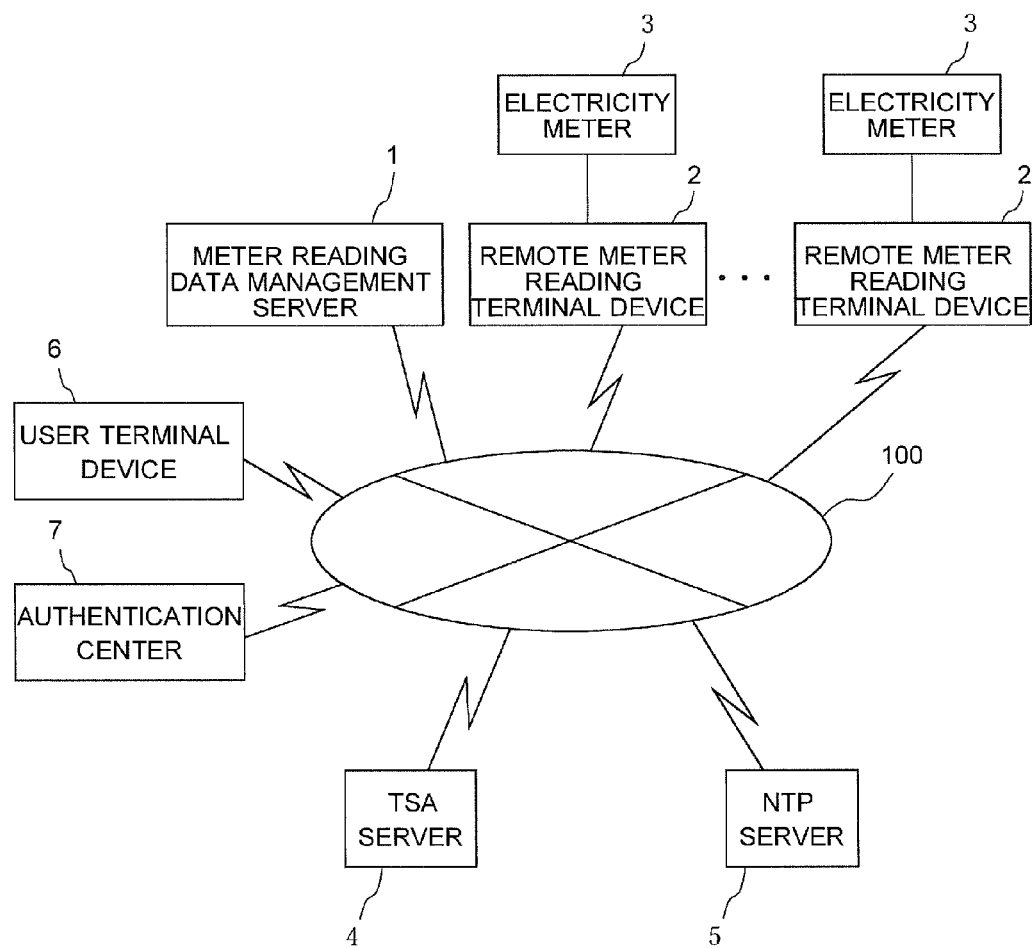
FIG. 1 is a block diagram showing a configuration of a measurement data management system according to an embodiment of the present invention.

FIG. 1 is a block diagram showing a configuration of a measurement data management system according to an embodiment of the present invention. As shown in FIG. 1, the measurement data management system according to the present embodiment includes a meter reading data management server 1 and a plurality of remote meter reading terminal devices 2. The meter reading data management server 1 and the remote meter reading terminal devices 2 are connected via the Internet 100 such that they can communicate with one another. Communication among the meter reading data management server 1 and the remote meter reading terminal devices 2 is performed via a virtual private network (VPN) and therefore maintains high security.

The remote meter reading terminal devices 2 are installed in buildings and the like with electricity generation equipment such as photovoltaic equipment, and are connected to electricity meters 3 that measure the amount of electricity generated by the electricity generation equipment. The electricity meters 3 output a telegraph in a predetermined format including a meter reading value to the remote meter reading terminal devices 2. The remote meter reading terminal devices 2 generate meter reading information using the telegraph received from the electricity meters 3 in a manner described later, and transmit the generated meter reading information to the meter reading data management server 1. The specifics of a configuration of the meter reading data management server 1 will be described later.

The remote meter reading terminal devices 2 include a display unit (not shown in the figures) constituted by, for example, a liquid crystal display. The display unit displays various types of information such as a meter reading value acquired from the electricity meters 3. The remote meter reading terminal devices 2 also include a storage unit (not shown in the figures) constituted by, for example, a nonvolatile memory. The storage unit stores therein various types of information such as meter reading information generated based on the telegraph acquired from the electricity meters 3.

A time stamping authority (TSA) server 4, a network time protocol (NTP) server 5, a user terminal device 6 and an authentication center 7 are connected to the Internet 100. The TSA server 4 is a time authentication authority that performs time authentication according to an archiving method. The NTP server 5 transmits time information to other devices connected to the Internet 100. The user terminal device 6 is operated by a user who uses the measurement data management system according to the present embodiment. The authentication center 7 authenticates measurement data managed by the measurement data management system according to the present embodiment.

[Configuration of Meter Reading Data Management Server]

The following describes the specifics of a configuration of the meter reading data management server 1 according to the present embodiment.

Figure 2:
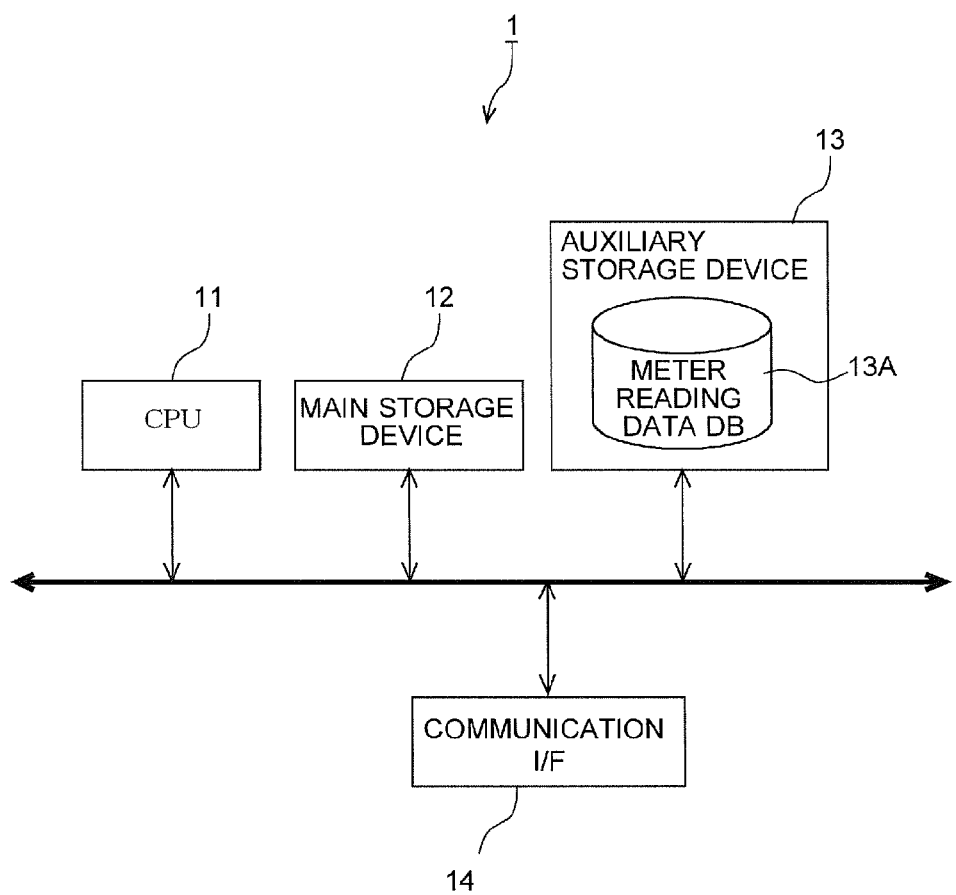
FIG. 2 is a block diagram showing a configuration of a meter reading data management server according to an embodiment of the present invention.

FIG. 2 is a block diagram showing a configuration of the meter reading data management server 1 according to an embodiment of the present invention. As shown in FIG. 2, the meter reading data management server 1 includes a CPU 11, a main storage device 12, an auxiliary storage device 13, and a communication interface (I/F) 14. Note that the CPU 11, the main storage device 12, the auxiliary storage device 13, and the communication I/F 14 are connected by a bus.

The CPU 11 executes computer programs stored in the auxiliary storage device 13. This enables the meter reading data management server 1 to execute various types of processing described later while controlling the operations of various types of devices.

The main storage device 12 is constituted by an SRAM, a DRAM, or the like, and is used to read the computer programs stored in the auxiliary storage device 13. The main storage device 12 is also used as a work area for the CPU 11 when the CPU 11 executes the computer programs.

The auxiliary storage device 13 is constituted by a nonvolatile storage device such as a flash memory and a hard disk, and stores therein, for example, various types of computer programs to be executed by the CPU 11, and data used for the execution of these computer programs. The auxiliary storage device 13 includes a meter reading data DB 13A which will be described later.

The communication I/F 14 is an interface device for communicating with various types of devices via the Internet 100. Because the communication among the meter reading data management server 1 and the remote meter reading terminal devices 2 is performed via the VPN as mentioned earlier, the communication I/F 14 has a function of a VPN router.

Figure 3:
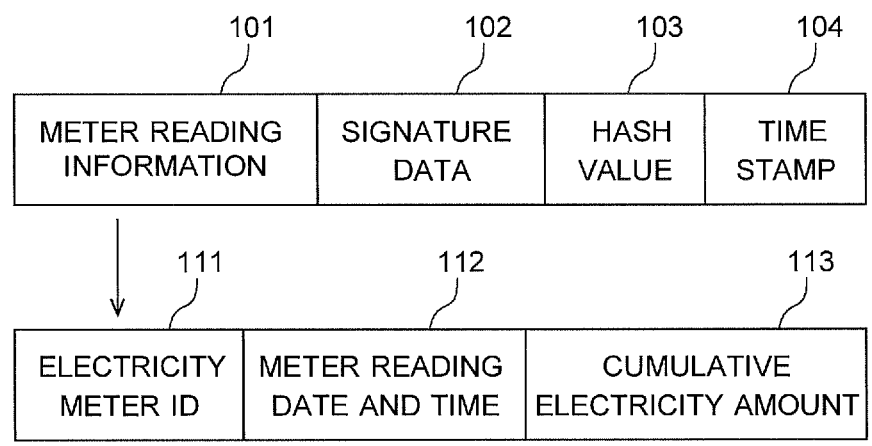
FIG. 3 shows a data structure of meter reading data stored in a meter reading data DB of a meter reading data management server according to an embodiment of the present invention.

FIG. 3 shows a data structure of meter reading data stored in the meter reading data DB 13A of the meter reading data management server 1 according to an embodiment of the present invention. As shown in FIG. 3, the meter reading data is constituted by meter reading information 101, signature data 102, a hash value 103, and a time stamp 104. The meter reading information 101 includes a meter reading value acquired from an electricity meter 3. The signature data 102 is generated by a remote meter reading terminal device 2. The hash value 103 is generated by the meter reading data management server 1 based on the meter reading information 101. The time stamp 104 is generated by the TSA server 4.

As shown in FIG. 3, the meter reading information 101 is constituted by an electricity meter ID (e.g. a manufacturing number) 111 for identifying an electricity meter 3, meter reading date and time 112 indicating the date and time when the electricity meter 3 performed the meter reading, and a cumulative electricity amount 113 which is a meter reading value acquired from the electricity meter 3. As will be described later, the electricity meter ID 111, the meter reading date and time 112, and the cumulative electricity amount 113 are transmitted from the remote meter reading terminal device 2 to the meter reading data management server 1.

[Operations of Measurement Data Management System]

A description is now given of the operations of the measurement data management system according to the present embodiment, configured in the above-described manner, with reference to flowcharts. Main processing executed by the measurement data management system according to the present embodiment is as follows: (1) start-up processing for a remote meter reading terminal device, which is executed by the remote meter reading terminal devices 2 upon start-up, (2) live check processing for a remote meter reading terminal device, for notifying the meter reading data management server 1 that the remote meter reading terminal devices 2 are operating normally, and (3) meter reading processing executed by the meter reading data management server 1 and the remote meter reading terminal devices 2. The following describes the specifics of each processing listed above.

(1) Start-up Processing for Remote Meter Reading Terminal Device

Figure 4:
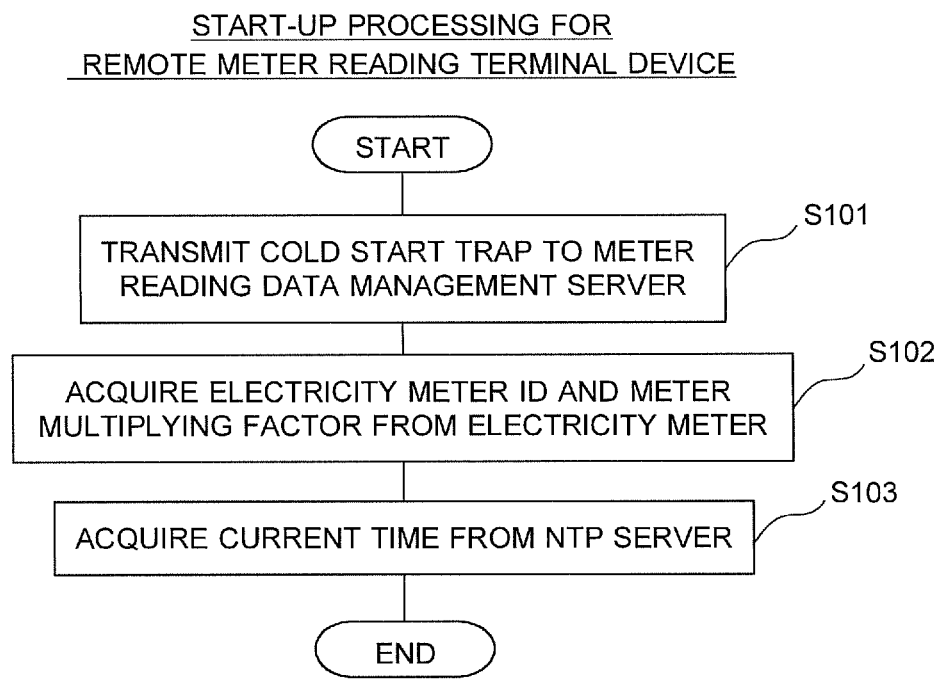
FIG. 4 is a flowchart of start-up processing for a remote meter reading terminal device, which is executed by remote meter reading terminal devices according to an embodiment of the present invention.

FIG. 4 is a flowchart of start-up processing for a remote meter reading terminal device, which is executed by remote meter reading terminal devices according to an embodiment of the present invention.

Upon start-up, a remote meter reading terminal device 2, namely a simple network management protocol (SNMP) agent, transmits a cold start trap to the meter reading data management server 1, namely an SNMP manager (S101).

Next, the remote meter reading terminal device 2 acquires, from the electricity meter 3 connected thereto, an electricity meter ID that is information unique to that electricity meter 3 and a meter multiplying factor (S102). The remote meter reading terminal device 2 also acquires the current time from the NTP server 5 via the Internet 100 (S103). This completes the start-up processing for the remote meter reading terminal device.

(2) Live Check Processing for Remote Meter Reading Terminal Device

After the start-up processing for the remote meter reading terminal device has been executed in the above-described manner, the remote meter reading terminal device 2 does not access the meter reading data management server 1 until the meter reading date and time. Therefore, in the case where the meter reading is performed at relatively long intervals, such as once a month or once a year, it is necessary to check whether or not the remote meter reading terminal device 2 is operating normally. This is the object of the live check processing for the remote meter reading terminal device described below.

Figure 5:
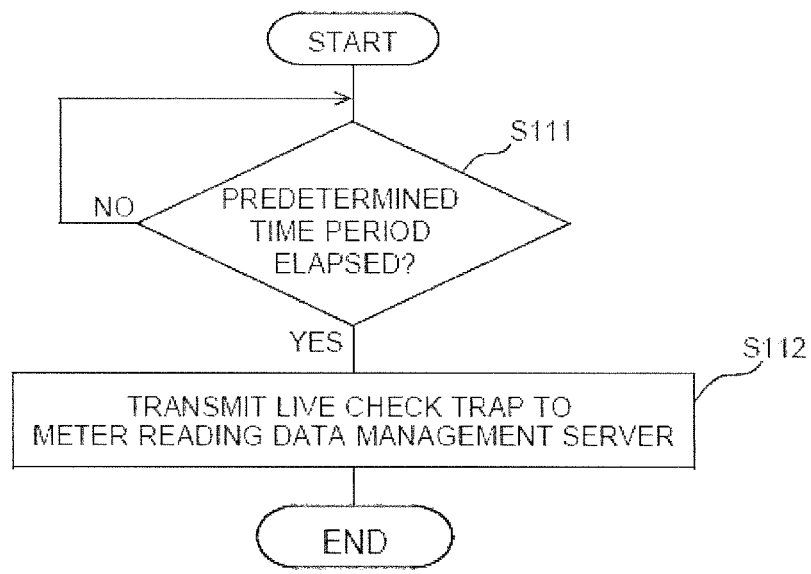
FIG. 5 is a flowchart of live check processing for a remote meter reading terminal device, which is executed by remote meter reading terminal devices according to an embodiment of the present invention.

FIG. 5 is a flowchart of live check processing for a remote meter reading terminal device, which is executed by remote meter reading terminal devices according to an embodiment of the present invention.

While operating, a remote meter reading terminal device 2 repeatedly determines whether or not a predetermined time period (e.g. five minutes) has elapsed (S111). When determining that the predetermined time period has elapsed (the YES branch of S111), the remote meter reading terminal device 2, namely the SNMP agent, transmits a live check trap to the meter reading data management server 1, namely the SNMP manager (S112). Upon receiving this live check trap, the meter reading data management server 1 can confirm that the remote meter reading terminal device 2, which is the transmission source of the live check trap, is operating normally.

In the case where the meter reading data management server 1 detects an abnormality, such as when the live check trap is damaged for a predetermined consecutive number of times, the meter reading data management server 1 warns an administrator by outputting warning information indicative of the abnormality. In this case, the administrator investigates, for example, whether or not a network failure has occurred and whether or not the operation of the remote meter reading terminal device 2 has stopped.

(3) Meter Reading Processing

Figure 6:
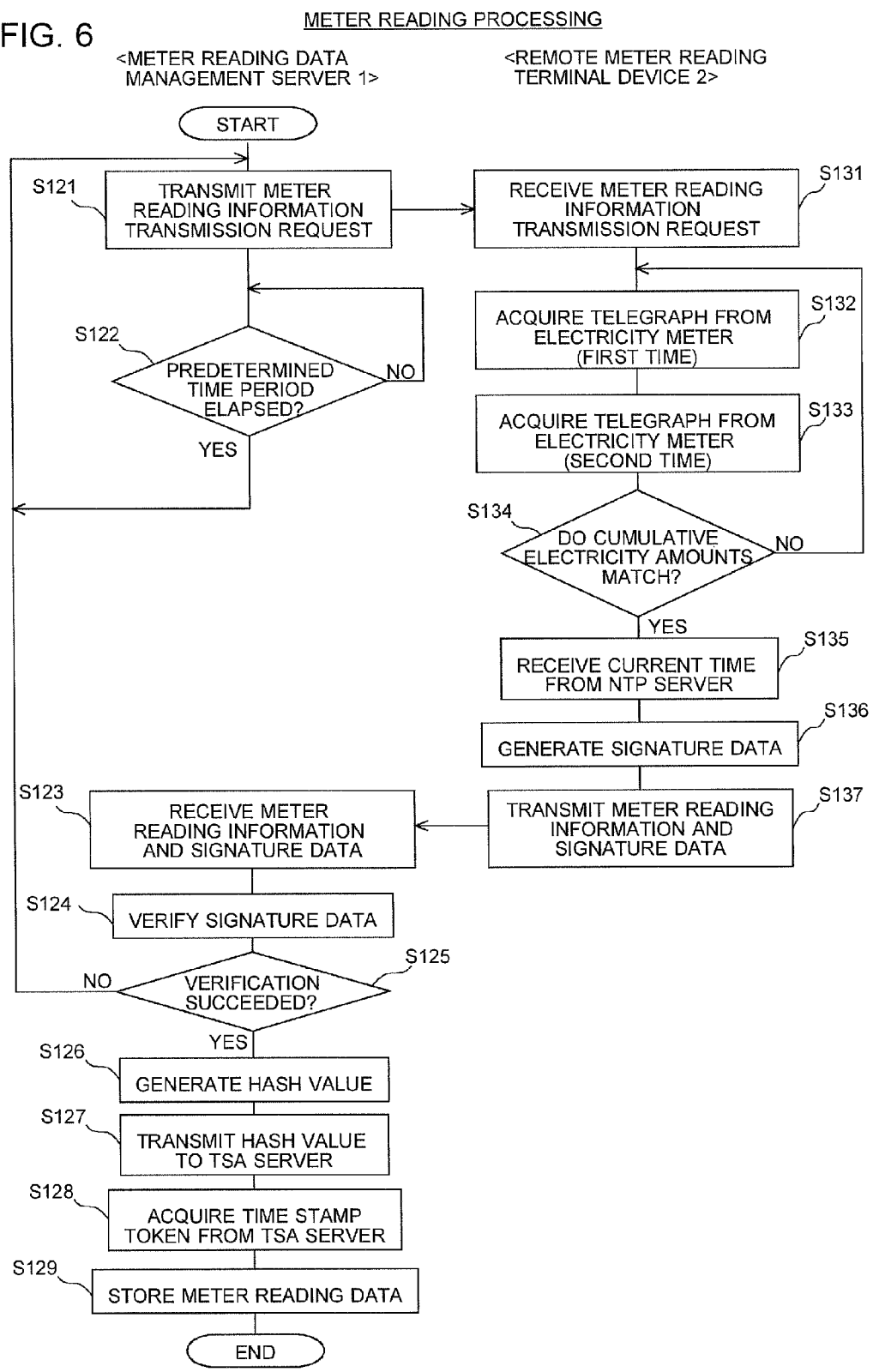
FIG. 6 is a flowchart of meter reading processing executed by a measurement data management system according to an embodiment of the present invention.

FIG. 6 is a flowchart of the meter reading processing executed by the measurement data management system according to an embodiment of the present invention. For example, this meter reading processing is executed at a timing when the meter reading data management server 1 receives a request for acquisition of meter reading data from the user terminal device 6. When the user terminal device 6 thus transmits a request for acquisition of meter reading data to the meter reading data management server 1, the request for acquisition includes an identifier of an electricity meter 3 (or of a remote meter reading terminal device 2 connected to that electricity meter 3). Upon receiving the request for acquisition, the meter reading data management server 1 executes processing described later on the remote meter reading terminal device 2 connected to the electricity meter 3 identified by the identifier (or on the remote meter reading terminal device 2 identified by the identifier). As a result, each user can acquire meter reading data of a desired electricity meter 3.

First, the meter reading data management server 1 transmits a meter reading information transmission request for requesting a transmission of meter reading information to the remote meter reading terminal device 2 (S121). The meter reading data management server 1 waits for the meter reading information to be transmitted from the remote meter reading terminal device 2 in response to the meter reading information transmission request for a predetermined time period (e.g. approximately one minute) (S122). When the predetermined time period has elapsed without the meter reading data management server 1 receiving the meter reading information from the remote meter reading terminal device 2 (the YES branch of S122), the meter reading management server 1 re-transmits the meter reading information transmission request to the remote meter reading terminal device 2 (S121). For example, when the meter reading information is still not received from the remote meter reading terminal device 2 after repeating this re-transmission three times, the meter reading processing fails.

When the remote meter reading terminal device 2 receives the meter reading information transmission request transmitted from the meter reading data management server 1 (S131), it acquires a telegraph including a cumulative electricity amount from the electricity meter 3 (S132). The remote meter reading terminal device 2 acquires a telegraph including a cumulative electricity amount from the electricity meter 3 again (S133), and determines whether or not the value of the cumulative electricity amount included in the first telegraph acquired in step S132 matches the value of the cumulative electricity amount included in the second telegraph acquired in step S133 by comparing the two cumulative electricity amounts (S134).

When the remote meter reading terminal device 2 determines that the cumulative electricity amounts included in the two telegraphs do not match in step S134 (the NO branch of S134), it returns to step S132, re-acquires a telegraph from the electricity meter 3 twice in a row, and determines whether or not the cumulative electricity amounts included in the two telegraphs match. For example, when the values of the two cumulative electricity amounts still do not match after repeating the above processes three times, the meter reading processing fails. By executing the above processes, the accuracy of the meter reading value of the electricity meter 3 can be ensured.

When the remote meter reading terminal device 2 determines that the values of the cumulative electricity amounts included in the two telegraphs match in step S134 (the YES branch of S134), it acquires the current time from the NTP server 5 via the Internet 100 (S135). The current time acquired from the NTP server 5 in the above manner serves as the meter reading date and time of the electricity meter 3. In this way, the accuracy of the meter reading date and time of the electricity meter 3 can be ensured.

Thereafter, the remote meter reading terminal device 2 generates signature data by applying electronic signature using the meter reading information constituted by the electricity meter ID acquired from the electricity meter 3 in the start-up processing, the meter reading date and time of the electricity meter 3 acquired in step S135, and the cumulative electricity amount included in the telegraphs acquired from the electricity meter 3 (S136). More specifically, the remote meter reading terminal device 2 generates signature data using, for example, an RSA encryption method whereby the meter reading information is encrypted with a private key having a predetermined length. The remote meter reading terminal device 2 transmits the signature data generated in the above manner to the meter reading data management server 1 together with the meter reading information (S137).

When the meter reading data management server 1 receives the meter reading information and the signature data from the remote meter reading terminal device 2 (S123), it executes verification processing by decrypting the signature data with a public key (S124). The meter reading data management server 1 then determines whether or not this verification has succeeded (S125). Specifically, when the decryption has failed, or when the value obtained as a result of the decryption does not match the meter reading information, the meter reading data management server 1 determines that the verification of the signature data has failed (the NO branch of S125), returns to step S121, and repeats the subsequent processes (re-performs the meter reading). For example, the meter reading is re-performed only once; when the verification of the signature data fails again, the meter reading data management server 1 warns the administrator by outputting warning information indicative of the failure.

On the other hand, when the value obtained as a result of the decryption matches the meter reading information, it is confirmed that the meter reading information has been received from the remote meter reading terminal device 2, and the meter reading data management server 1 determines that the verification of the signature data has succeeded (the YES branch of S125). In this case, the meter reading data management server 1 generates a hash value of the meter reading information using a predetermined hash function (S126). The meter reading data management server 1 then transmits the generated hash value to the TSA server 4 via the Internet 100 (S127).

When the TSA server 4 receives the hash value from the meter reading data management server 1, it generates a time stamp token by combining the hash value with the current time, and transmits the time stamp token to the meter reading data management server 1. Here, the TSA server 4 may apply electronic signature to the time stamp token. This makes it possible to verify that the TSA server 4 generated the time stamp token.

The TSA server 4 stores therein the time stamp token generated in the above manner so as to use it in time stamp verification processing that is executed afterward. In this way, both the meter reading data management server 1 and the TSA server 4 store therein the same time stamp token. Below, the time stamp token thus stored in the TSA server 4 is referred to as a verification time stamp token.

When the meter reading data management server 1 receives the time stamp token from the TSA server 4 via the Internet 100 (S128), it stores the meter reading data constituted by the received time stamp token (the hash value and the time stamp) as well as the above-described meter reading information and signature data received from the remote meter reading terminal device 2 into the meter reading data DB 13A (S129).

By repeating the above meter reading processing, the meter reading data is accumulated in the meter reading data management server 1.

Note that when the above meter reading processing is executed in response to a request from the user terminal device 6, the meter reading data management server 1 transmits the meter reading data stored in step S129 to the user terminal device 6 and the authentication center 7. Subsequently, the authentication center 7 and the TSA server 4 execute processing for verifying the time stamp included in the meter reading data. The following describes this processing, i.e. (4) time stamp verification processing.

(4) Time Stamp Verification Processing

Figure 7:
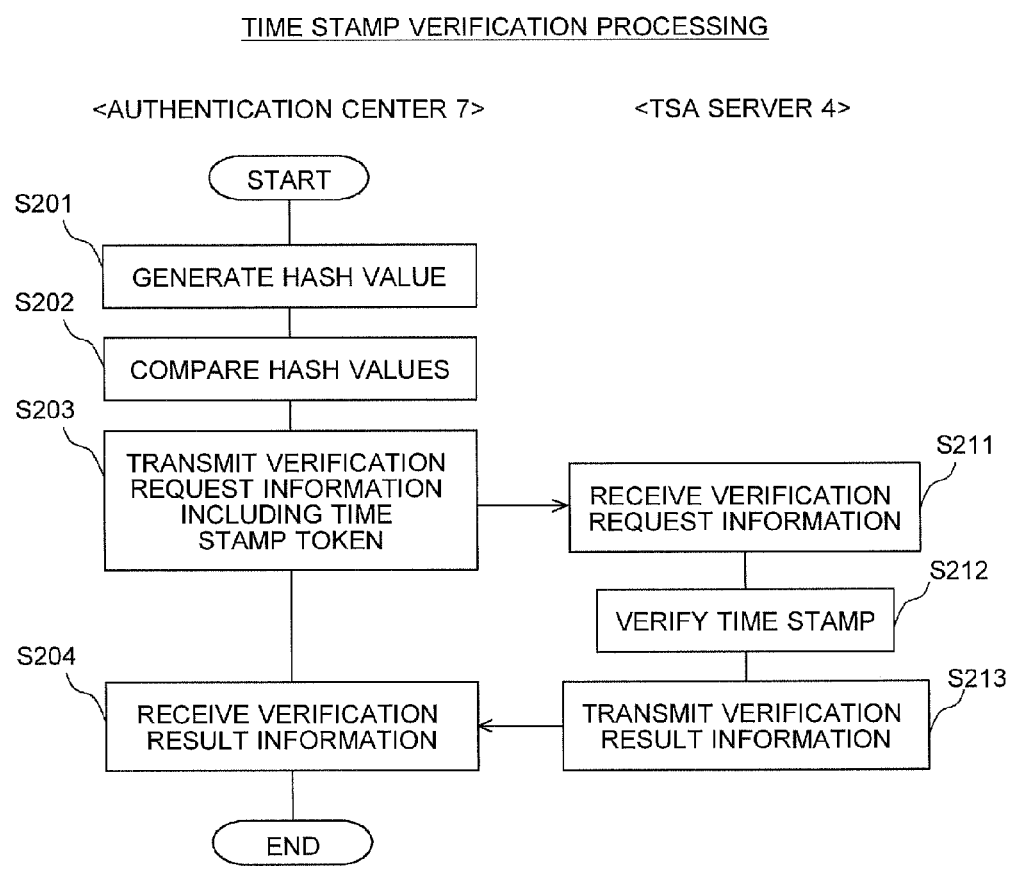
FIG. 7 is a flowchart of time stamp verification processing executed by an authentication center and a TSA server.

FIG. 7 is a flowchart of the time stamp verification processing executed by the authentication center 7 and the TSA server 4.

When the authentication center 7 receives an instruction for executing the time stamp verification processing from the user terminal device 6, it generates a hash value of the meter reading information included in the meter reading data received from the meter reading data management server 1 using a predetermined hash function (the same as the hash function used by the meter reading data management server 1 in the aforementioned step S126) (S201). The authentication center 7 compares the generated hash value with the hash value included in the meter reading data (S202). When the authentication center 7 confirms that the two hash values match, it transmits verification request information including the time stamp token to the TSA server 4 (S203).

When the TSA server 4 receives the verification request information transmitted from the authentication center 7 (S211), the TSA server 4 executes the time stamp verification processing by comparing the time stamp token included in the received verification request information with the verification time stamp token that was stored earlier (S212). When the hash values included in the two time stamp tokens match, the verification succeeds. When they do not match, the verification fails. The TSA server 4 transmits verification result information indicative of whether or not the verification has succeeded to the authentication center 7 (S213).

The authentication center 7 receives the verification result information transmitted from the TSA server 4 (S204). When this verification result information indicates that the verification of the time stamp has succeeded, it means that the meter reading information existed at the time when the time stamp was generated and that the meter reading information was not tampered with between the time when the time stamp was generated and the current time. In this case, the authentication center 7 transmits information indicating that the meter reading data has been authenticated to the user terminal device 6. This allows the user to confirm that the meter reading information has not been tampered with.

Although the electricity meters have been described in the present embodiment as examples of meters, the present invention is not limited to the electricity meters, but may be applied to the cases where other meters such as gas meters or water meters are used. When these other meters are used, it is still possible to check, for example, whether the measurement data has not been tampered with in the course of communication as with the case of the present embodiment described above.

As has been described above, communication among the meter reading data management server 1 and the remote meter reading terminal devices 2 is performed via the SNMP in the present embodiment. This, however, is merely an example. The communication among the meter reading data management server 1 and the remote meter reading terminal devices 2 may be performed using other communication protocols.

INDUSTRIAL APPLICABILITY

A measurement data management method and a measurement data management system according to the present invention are useful as a measurement data management method and a measurement data management system for measurement data related to the amount of generated electricity and the like.

DESCRIPTION OF REFERENCE NUMERALS

1 METER READING DATA MANAGEMENT SERVER
2 REMOTE METER READING TERMINAL DEVICE
3 ELECTRICITY METER
4 TSA SERVER
5 NTP SERVER
6 USER TERMINAL DEVICE
7 AUTHENTICATION CENTER
11 CPU
12 MAIN STORAGE DEVICE
13 AUXILIARY STORAGE DEVICE
13A METER READING DATA DB
14 COMMUNICATION INTERFACE
100 INTERNET
101 METER READING INFORMATION
102 SIGNATURE DATA
103 HASH VALUE
104 TIME STAMP
111 ELECTRICITY METER ID
112 METER READING DATE AND TIME
113 CUMULATIVE ELECTRICITY AMOUNT

The invention claimed is:

1. A measurement data management method for managing measurement data using a terminal device, a measurement data management device, an authentication device, and a time authentication authority, the measurement data including a measured value acquired through measurement processing executed by a meter, the terminal device being connected to the meter, the measurement data management device being communicably connected to the terminal device and managing the measurement data, the authentication device authenticating the measurement data managed by the measurement data management device, and the time authentication authority authenticating time, wherein the terminal device executes:
an electronic signature step of generating electronic signature data based on measurement information including the measured value acquired through the measurement processing executed by the meter, measurement date and time when the measurement processing is executed, and an identifier for identifying the meter; and
a transmission step of transmitting the electronic signature data generated in the electronic signature step and the measurement information to the measurement data management device, the measurement data management device executes:
an electronic signature data verification step of verifying the electronic signature data received from the terminal device;
a hash value generation step of, when the verification of the electronic signature data has succeeded in the electronic signature data verification step, generating a hash value of the measurement information received from the terminal device;
a hash value transmission step of transmitting the hash value generated in the hash value generation step to the time authentication authority;
a time stamp acquisition step of acquiring, from the time authentication authority, a time stamp token including the hash value and a time stamp generated by the time authentication authority based on the hash value; and
a measurement data storage step of storing measurement data including the measurement information, the electronic signature data, and the time stamp token acquired in the time stamp acquisition step, the authentication device executes:
a measurement data acquisition step of acquiring the measurement data from the measurement data management device; and
a time stamp verification request step of transmitting the time stamp token included in the measurement data acquired in the measurement data acquisition step to the time authentication authority so as to request the time authentication authority to verify the time stamp included in the time stamp token, and the time authentication authority executes:
a time stamp token storage step of storing the time stamp token that has been generated based on the hash value acquired as a result of the hash value transmission step;
a time stamp verification step of verifying the time stamp included in the time stamp token that has been acquired from the authentication device as a result of the time stamp verification request step based on the hash value included in the time stamp token stored in the time stamp token storage step; and
a verification result transmission step of transmitting a result of the verification of the time stamp verification step to the authentication device; and wherein the terminal device further executes a determination step of acquiring the measured value from the meter multiple times and determining whether or not the multiple measured values thus acquired match, and executes the electronic signature step when it has been determined that the multiple measured values match in the determination step.

2. The measurement data management method according to claim 1, wherein
the measurement data management device further executes a measurement data transmission step of transmitting the measurement data stored in the measurement data storage step to an external device, and
the time stamp included in the measurement data is verified by the external device that has received the measurement data from the measurement data management device and the time authentication authority.

3. The measurement data management method according to claim 2, wherein
in the electronic signature step, the terminal device acquires the measurement date and time from an external NTP server.

4. The measurement data management method according to claim 3, wherein
the terminal device further executes a determination step of acquiring the measured value from the meter multiple times and determining whether or not the multiple measured values thus acquired match, and executes the electronic signature step when it has been determined that the multiple measured values match in the determination step.

5. The measurement data management method according to claim 2, wherein
the terminal device further executes a determination step of acquiring the measured value from the meter multiple times and determining whether or not the multiple measured values thus acquired match, and executes the electronic signature step when it has been determined that the multiple measured values match in the determination step.

6. The measurement data management method according to claim 1, wherein
in the electronic signature step, the terminal device acquires the measurement date and time from an external NTP server.

7. The measurement data management method according to claim 6, wherein
the terminal device further executes a determination step of acquiring the measured value from the meter multiple times and determining whether or not the multiple measured values thus acquired match, and executes the electronic signature step when it has been determined that the multiple measured values match in the determination step.

8. A measurement data management system comprising: a terminal device, a measurement data management device, an authentication device, and a time authentication authority, the terminal device being connected to a meter, the measurement data management device being communicably connected to the terminal device and managing measurement data that includes a measured value acquired through measurement processing executed by the meter, the authentication device authenticating the measurement data managed by the measurement data management device, and the time authentication authority authenticating time, wherein
the terminal device is configured to:
generate electronic signature data based on measurement information including the measured value acquired through the measurement processing executed by the meter, measurement date and time when the measurement processing is executed, and an identifier for identifying the meter; and
transmit the electronic signature data and the measurement information to the measurement data management device,
the measurement data management device is configured to:
verify the electronic signature data received from the terminal device;
generate a hash value of the measurement information received from the terminal device when the measurement data management device has succeeded in the verification of the electronic signature data;
transmit the generated hash value to the time authentication authority;
acquire, from the time authentication authority, a time stamp token including the hash value and a time stamp generated by the time authentication authority based on the hash value; and
store measurement data including the measurement information, the electronic signature data, and the acquired time stamp token,
the authentication device is configured to:
acquire the measurement data from the measurement data management device; and
transmit the time stamp token included in the acquired measurement data to the time authentication authority so as to request the time authentication authority to verify the time stamp included in the time stamp token, and the time authentication authority is configured to:
store the time stamp token that has been generated based on the hash value acquired from the measurement data management device;
verify the time stamp included in the time stamp token that has been acquired from the authentication device based on the hash value included in the stored time stamp token; and
transmit a result of the verification to the authentication device; and the terminal device is further configured to acquire the measured value from the meter multiple times, determine whether or not the multiple measured values thus acquired match, and generate the electronic signature data when the terminal device has determined that the multiple measured values match.

9. The measurement data management system according to claim 8, wherein
the measurement data management device is further configured to transmit the stored measurement data to an external device that verifies the time stamp included in the measurement data together with the time authentication authority.

10. The measurement data management system according to claim 9, wherein
the terminal device is configured to acquire the measurement date and time from an external NTP server.

11. The measurement data management system according to claim 10, wherein
the terminal device is further configured to acquire the measured value from the meter multiple times, determine whether or not the multiple measured values thus acquired match, and
generate the electronic signature data when the terminal device has determined that the multiple measured values match.

12. The measurement data management system according to claim 9, wherein
the terminal device is further configured to acquire the measured value from the meter multiple times, determine whether or not the multiple measured values thus acquired match, and
generate the electronic signature data when the terminal device has determined that the multiple measured values match.

13. The measurement data management system according to claim 8, wherein
the terminal device is further configured to acquire the measurement date and time from an external NTP server.

14. The measurement data management system according to claim 13, wherein
the terminal device is further configured to acquire the measured value from the meter multiple times, determine whether or not the multiple measured values thus acquired match, and
generate the electronic signature data when the terminal device has determined that the multiple measured values match.

* * * * *